United States Patent [19]

Petersen

[11] Patent Number: 5,408,468
[45] Date of Patent: Apr. 18, 1995

[54] QUEUEING SYSTEM FOR SWITCHES HAVING FAST CIRCUIT PROPERTIES

[75] Inventor: Lars-Goran Petersen, Tumba, Sweden

[73] Assignee: Telefonaktiebolaget L M Ericsson, Stockholm, Sweden

[21] Appl. No.: 64,445

[22] Filed: May 21, 1993

[30] Foreign Application Priority Data

May 22, 1992 [SE] Sweden ................................. 9201622

[51] Int. Cl.$^6$ ........................ H04L 12/16; H04M 3/42
[52] U.S. Cl. ..................................... 370/58.2; 370/62; 370/68.1; 379/309
[58] Field of Search .................. 370/54, 58.1, 58.2, 370/58.3, 62, 68.1; 379/265, 266, 309

[56] References Cited

U.S. PATENT DOCUMENTS

| | | | |
|---|---|---|---|
| 3,969,589 | 7/1976 | Meise, Jr. et al. | 379/266 |
| 4,012,597 | 3/1977 | Lynk, Jr. et al. | 455/54.2 |
| 4,020,290 | 4/1977 | Perna et al. | 370/58.2 |
| 4,512,015 | 4/1985 | Kanó et al. | 370/58.3 |
| 4,953,204 | 8/1990 | Cuschleg, Jr. et al. | 379/266 |
| 5,166,974 | 11/1992 | Morganstein et al. | 379/266 |
| 5,278,898 | 1/1994 | Cambray et al. | 379/266 |

FOREIGN PATENT DOCUMENTS

| | | |
|---|---|---|
| 2658912 | 7/1980 | Germany . |
| 3203052 | 8/1983 | Germany . |
| 2855473 | 2/1986 | Germany . |

OTHER PUBLICATIONS

Patent Abstract of Japan, vol. 13, nr. 307, JP 1-082725 (Mar. 28, 1989).

Primary Examiner—Douglas W. Olms
Assistant Examiner—Hassan Kizou
Attorney, Agent, or Firm—Burns, Doane, Swecker & Mathis

[57] ABSTRACT

A digital switch serves a number of terminal units for switching signal traffic therebetween, the traffic being logically divided into data time slots and control time slots with control packets. It comprises a switch memory for receiving the data time slots, a control memory containing information for facilitating through connection of the data time slots in the switch memory, a control memory terminal for receiving the control time slots and control packets located therein, for writing information into the control memory, and for transmitting acknowledgement packets to called and calling ones of the terminal units, and an occupied/unoccupied memory cooperating with the control memory terminal and storing actual status of each of the terminal units. A queue system is associated with the control memory terminal and the occupied/unoccupied memory, the queue system including memory and control logic for effecting, in case a first terminal unit tries to establish connection to a second terminal unit that is occupied, queueing of a call request and transmission to the first terminal unit of an acknowledgement "request for connection queued" and, at the receipt of a request for disconnection from the second terminal unit, direct connection of the first terminal unit to the second terminal unit, and transmission of acknowledgements to the first and second terminal units with the information "connection effected" and "request effected", respectively.

20 Claims, 4 Drawing Sheets

QUEUEING SYSTEM FOR SWITCHES HAVING FAST CIRCUIT PROPERTIES

BACKGROUND

The present invention relates to a digital switch serving a number of terminal units for switching signal traffic therebetween, said traffic being logically divided into data time slots and control time slots with control packages or packets, comprising a switch memory for receiving said data time slots, a control memory containing information for facilitating through connection of said data time slots in said switch memory, a control memory terminal for receiving said control time slots and control packages located therein, and writing information into the control memory, and for transmitting acknowledgement packages to called and calling ones of said terminal units, an occupied/unoccupied memory cooperating with said control memory terminal and storing actual status of each of said terminal units.

For market considerations telephone systems have been costwise orientated towards normal telephony. Today it can be seen how new requirements on data communication services grow increasingly stronger. On the one hand this depends upon the telephone network having become "the biggest distributed computer system of the world" with requirements for integrated signalling system (number 7), and on the other hand upon new services such as e.g. ISDN (Integrated Services Digital Network) now being close to their realisation. To this comes X.25 networks and similar.

In order to costwise meet the expected expansion of the data communication services mentioned above in an optimum way and to enable "integrated control routes" in a telephone exchange for communication between internal control processors, it is desirable in the next generation of telecommunication systems to build switches with "Fast-Circuit" properties. By this is meant a switch, where the nodes connected to the switch, independently of whether it is a simple subscriber line card or a powerful processor, with lightning rapidity shall be able to transmit a request for connection to the switch, which performs the required operation and transmits an acknowledgment back. Then a route has been established through the switch. An example of a switch with "Fast-circuit" properties is described in PCT/SE92/00819. Due to its properties this switch can also serve as a data communication switch with high performance.

One of the most difficult problems in data communication switching is to achieve a fair distribution when several transmitters want to transmit to a receiver simultaneously in e.g. a star network or correspondingly for buses/rings when all nodes share the same media and want to transmit simultaneously. As examples of solutions for buses, contention detection with "back-off" algorithms for e.g. ETHERNET-networks and "Tokens" can be mentioned, which can be reserved.

In star networks the problem is usually solved by buffering the whole message in the star point, which then can be subject to a temporary congestion, with overspill as a consequence. Buffering furthermore works badly in other networks than those having moderate to low transmission rates (around 64 kb/s).

For star connected switches, as the one in the PCT patent application mentioned above, the problem also exists, but there it is for cost reasons not possible to buffer the whole data message (cost, volume, power and data rates).

This results in that two nodes can outcompete a third node in trying to transmit to the same receiver.

SUMMARY

The object of the invention is to solve the problem in a simple and cheap way to achieve a fair distribution when several transmitters want to transmit to one receiver simultaneously.

According to the invention this object has been achieved, in a digital switch of the kind indicated by way of introduction, by a queue system associated with said control memory terminal and said occupied/unoccupied memory, said queue system including memory means and control logic means for effecting, in case a first terminal unit tries to establish connection to a second terminal unit, which is occupied, queueing of a call request and transmission to said first terminal unit of an acknowledgment "request for connection queued" and, at the receipt of a request for disconnection from said second terminal unit, direct connection of said first terminal unit to said second terminal unit, and transmission of acknowledgements to said first and second terminal units with the information "connection effected" and "request effected" respectively.

According to one embodiment the switch includes a queue memory, and said occupied/unoccupied memory includes positions for terminal unit status codes "occupied and queued" and an associated first pointer to said queue memory.

One or several queue positions can be assigned to each position in said occupied/unoccupied memory and the pointer be realized by an address in said occupied/unoccupied memory.

According to a further embodiment the queue memory is used as a common resource.

For that purpose a pointer may be allocated to said occupied/unoccupied memory pointing to a next call stored in said queue memory for a receiver of a terminal unit associated with a position in said occupied/unoccupied memory.

Preferably the queue memory may be organized as a number of call positions, to which calls are assigned, the assigned positions being linked to each other and to said position in the occupied/unoccupied memory for building queue structures of variable lengths.

In accordance with a further very preferable embodiment the queue memory may have a number of call buffers, to each of which are assigned at least two queue positions, and a marker area indicating status of said at least two queue positions.

DESCRIPTION OF THE FIGURES

The invention will now be described in some detail with the aid of embodiments and with reference to the enclosed drawings, on which

DETAILED DESCRIPTION

Figure 1:
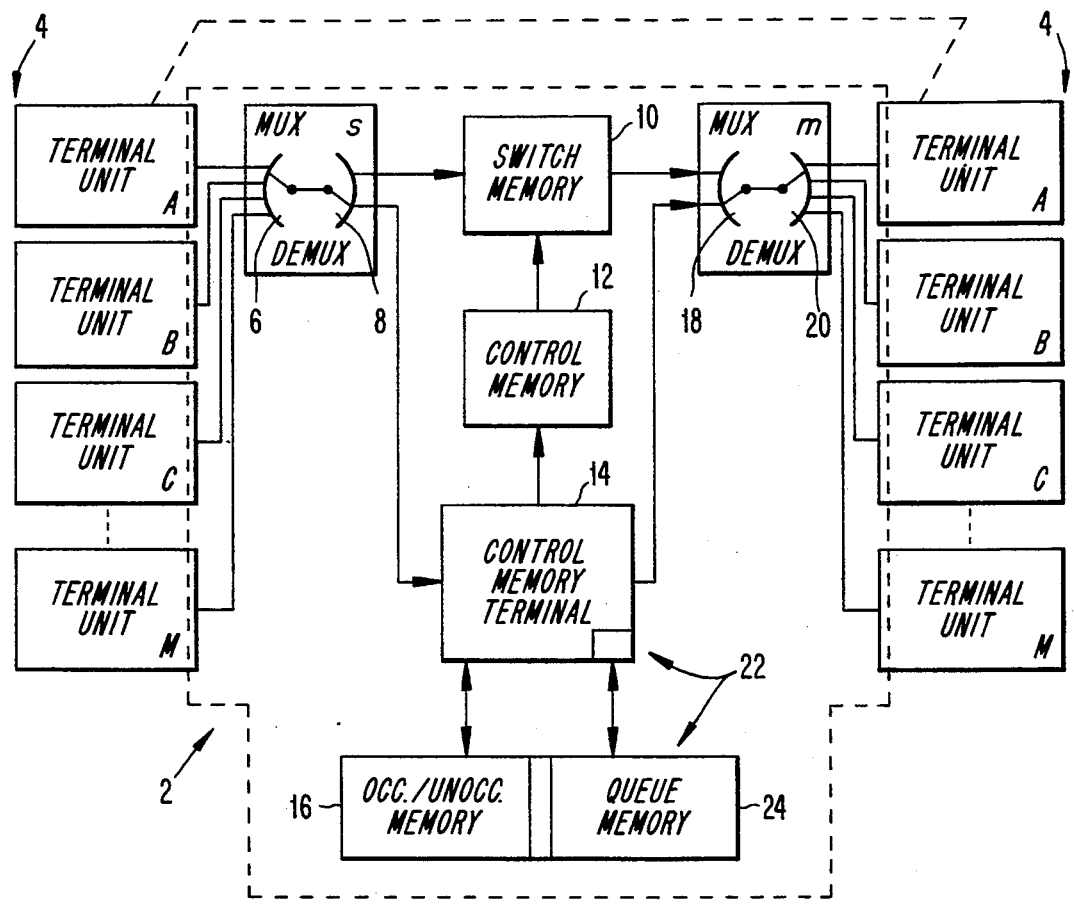
FIG. 1 is a functional block diagram of a digital switch with terminal units connected.

In FIG. 1 a digital switch is generally denoted with 2. To the switch 2 terminal units 4A-M are connected which are shown both from their transmitting side and receiving side, although the transmitting side and the receiving side of the same terminal unit together comprise one physical unit. The switch includes one multiplexor 6 arranged to concentrate traffic physically from the terminal units 4, which e.g. can include processor units. Said traffic is logically divided into data time slots and control time slots, the data time slots still being logically separated after the concentration while the control time slots are combined to form a common resource.

A demultiplexor 8 is arranged to separate the data time slots and the control time slots, a switch memory 10 receiving the data time slots. A control memory 12 includes information with the aid of which through connect of the data time slots in the switch memory 10 is effected. A control memory terminal 14 is arranged to receive the control time slots with the control packages, or packets, included therein and to write information into the control memory 12, as well as to transmit acknowledgement packages to the calling terminal unit with information as to whether connection has been accomplished or the receiving terminal unit is occupied.

Figure 2:
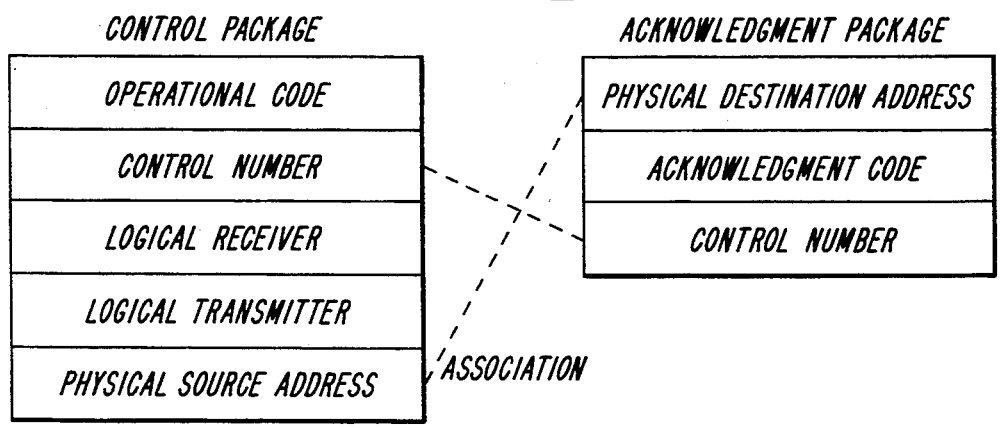
FIG. 2 is a logical format for control and acknowledgment packages in the switch according to FIG. 1.

FIG. 2 schematically illustrates the appearance of a control package and an acknowledgement package respectively.

The control package includes, according to FIG. 2, "operational code", which indicates the type of operation (connection or disconnection), "control number", "logical receiver", which indicates the addressed receiving terminal unit, "logical transmitter", which indicates the addressed transmitting terminal unit, and "physical source address" which indicates the physical address of the terminal unit which transmits the control request.

The acknowledgement package includes, also with reference to FIG. 2, "physical destination address" which indicates the physical address of the terminal unit which transmitted the original control request, "acknowledgment code", which indicates the type of acknowledgment (operation accomplished or not accomplished), and "control number".

The control memory terminal 16 picks up the "physical source address" from the control package and uses it as the "physical destination address" in the acknowledgment package. The "control number" is returned with the acknowledgment so that the terminal unit requesting control should know which control is served, if there are several waiting.

An occupied/unoccupied memory 16 works together with the control memory terminal 14 and includes stored information related to actual status for each terminal unit receiver.

A second multiplexor 18 is arranged to insert control time slots from the control memory terminal 14 and data time slots from the switch memory 10 on the same physical resource. A second demultiplexor 20 is arranged to separate the data time slots to the respective receiving terminal unit while the acknowledgment packages are directed to the addressed terminal unit.

What has been described above for the switch according to FIG. 1, as well as the following functional description, also appears from PCT/SE92/00819, which corresponds to allowed U.S. patent application No. 07/990,464 filed Dec. 15, 1992, from which further details can be derived and which is incorporated here by reference.

From one of the terminal units, e.g. 4A, a control package is transmitted for connection by means of the switch memory 10. The control package uses the same routes as the through connected data up to the multiplexor 6. There the control package is separated for further transport to the control memory terminal 14.

The control package includes an operational code which in this case is a request for connection with associated switching data pointing to a specified link. The control memory terminal 14 compares the operation request and associated switching data with the actual status of the requested connection through the switch memory 10. The actual status of each connection is stored in the occupied/unoccupied memory 16.

If the occupied/unoccupied memory 16 at a request for connection states that the addressed receiver, e.g. terminal unit 4M, is unoccupied the control memory terminal changes status "unoccupied" in the occupied/unoccupied memory 16 to the status "occupied", and writes the new connection into the control memory 12, which in turn affects the reading from the switch memory 10, so that a one way data route from the terminal unit 4A to the terminal unit 4M is established.

The control terminal 14 then transmits an acknowledgment package via the multiplexor 18 to the terminal unit 4A, letting the latter know that a request for connection has been acccomplished.

If now e.g. the terminal unit 4B wants to connect a link to the terminal unit 4M the control memory terminal 14, via the occupied/unoccupied memory 16, will realize that the terminal unit 4M is occupied.

It is this situation and the problems caused thereby that the present invention takes care of.

According to PCT/SE92/00819 mentioned above the control memory terminal 14 will transmit an acknowledgment package to the terminal unit 4B with the information that the addressed receiver is occupied. The indirect consequence is that the terminal unit 4B has to try later.

This is no ideal solution and it can create injustice by the terminal unit 4M always being occupied just as the terminal unit 4B tries to become connected, e.g. by the terminal unit 4C having managed to get in between. Another negative consequence is that the control memory terminal 14 is being stressed if e.g. the terminal unit 4B repeats its control package with request for connection with a high frequency to insure that it will get through.

By introducing, according to the invention, a system for a "fair queue function" described in detail below, these disadvantages with a "Fast Circuit Switch" can be eliminated. The functional additions which are required have been generally denoted 22 in FIG. 1, and comprise by implementation memory and control logic, which can be software or hardware.

As will appear from the description below the difference for the terminal unit B is that it gets the message request queued and an acknowledgment "request for connection queued" when it tries to connect to the terminal unit M, which is already connected to the terminal unit A according to the example described above.

When the terminal unit M transmits a control package with request for disconnect, the control memory terminal 14 directly connects terminal unit B to terminal unit M and sends an acknowledgment to both M ("request accomplished") and to B ("queued request for connection established").

This is effected by adding a status code for "occupied and queued" to the occupied/unoccupied memory 16 as well as an associated pointer to a queue memory 24 where waiting messages are stored.

To manage this extra function with the speed which is required by a "Fast Circuit Switch" additional logic is also required in the control memory terminal 14.

According to a first embodiment one or more queue positions can be assigned to each position in the occupied/unoccupied memory 16. In this case no pointer is required to the queue memory 24, as such a pointer inherently is understood to be present by the address in the occupied/unoccupied memory 16. One position in the occupied/unoccupied memory 16 is also representing a "logical receiver" (according to the definition given above with reference FIG. 2), position 1 then e.g. representing the terminal unit A, position 2 the terminal unit B, and so on.

Figure 3:
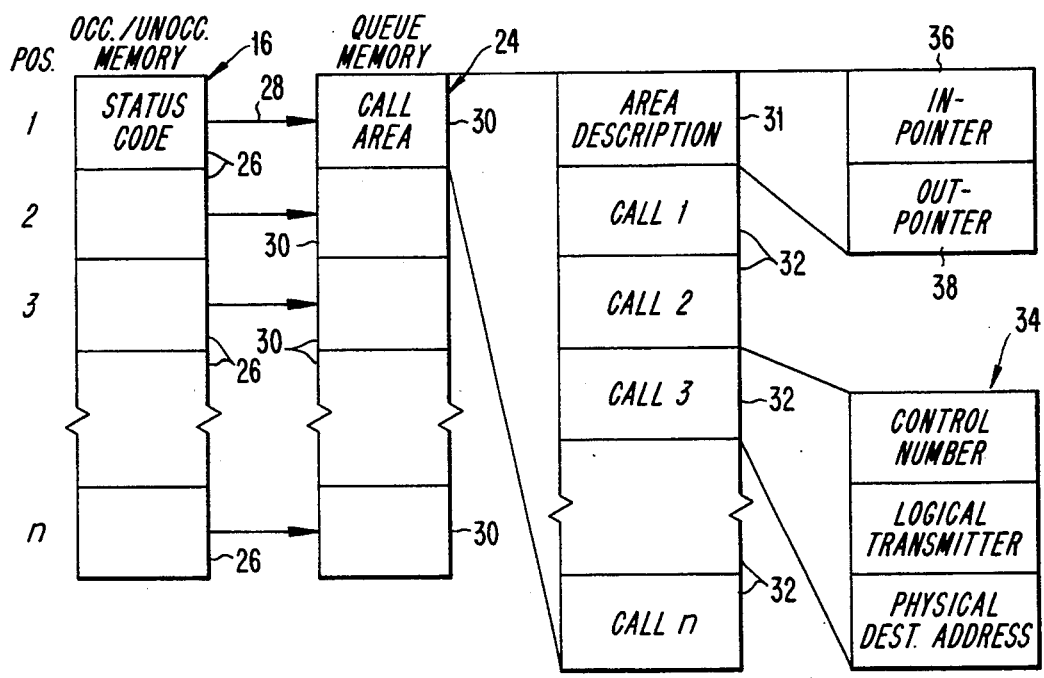
FIG. 3 shows the disposition of the occupied/unoccupied memory and the queue memory in a first embodiment of the invention.

FIG. 3 shows the disposition of the occupied/unoccupied memory 16 and the queue memory 24 for this first embodiment which is functionally simple.

The occupied/unoccupied memory 16 includes a number N of positions with each a status code, intimated at 26. These status codes are: "not used", "unoccupied", "occupied and queued", "occupied and not queued". To state status for "occupied and queued" and "occupied and not queued" directly in code is not necessary, as it can also appear from pointer values in a function "area description" indicated at 31, in the queue memory 24. However, it is an advantage from a management point of view to indicate this in the status code in the occupied/unoccupied memory 16 because one of the operational codes (compare FIG. 2) in a control package can be "connect if unoccupied, queue if nobody in front in queue".

Each position 26 in the occupied/unoccupied memory 16 points, indicated with a pointer 28, to its own "call area" 30, in the queue memory 24, which has a predefined size equally large for all positions 26 in the occupied/unoccupied memory 16. In each "call area" 30 an "area description" 31 and a number of positions for "calls" 32 are included. Each "call area" can store a number of calls 32 each with associated "control number", "logical transmitter" and "physical destination address" (compare FIG. 2), indicated at 34.

In the field 31 for "area description", "in-pointers" and "out-pointers" are stored at 36 and 38, respectively.

In-pointer 36 indicates where a next call shall be stored with respect to its call area 30. The in-pointer 36 is stepped one step after insertion, so that it points to the next unoccupied position. At the insertion of a call a check must be made that the in-pointer 36 does not have the same value as the out-pointer 38. If this is the case write must be prevented so that a call not serviced is not overwritten. The control memory terminal 14 may in this case transmit an acknowledgment which indicates that the receiver is occupied and that no queue positions are available.

The out-pointer 38 indicates which message is in turn to be served when the receiver is disconnected. If the control memory terminal 14 detects that the status code is queued at disconnect the switching data of the receiver is read from the part of the call area 30 indicated by the pointer. After establishment of the connection the out-pointer 38 is stepped to the next position. If the in-pointer 36 then equals the out-pointer 38 the control memory terminal 14 will change the status code of the receiver to "occupied but not queued". The control memory terminal 14 transmits, of course, also an acknowledgment to the queueing terminal unit informing that the requested connection is established. The "physical destination address" (compare FIG. 2) is collected from the call pointed to in the call area 30.

A call area is managed as a circulating buffer, implying that when a pointer has reached the last position it will be stepped to the first position.

The control memory terminal 14 should include a control logic (software or hardware) for comparing the pointers 36, 38 with each other and with the last possible position in the call area 30 and taking the above described measures.

The above described embodiment implying a simpler logical implementation can result in a waste of queue memory by reserving a call area of a given size for all receivers. This is especially true in cases where only a few of the connected terminal units are processor units, of which in turn only some need to use the queueing function.

Figure 4:
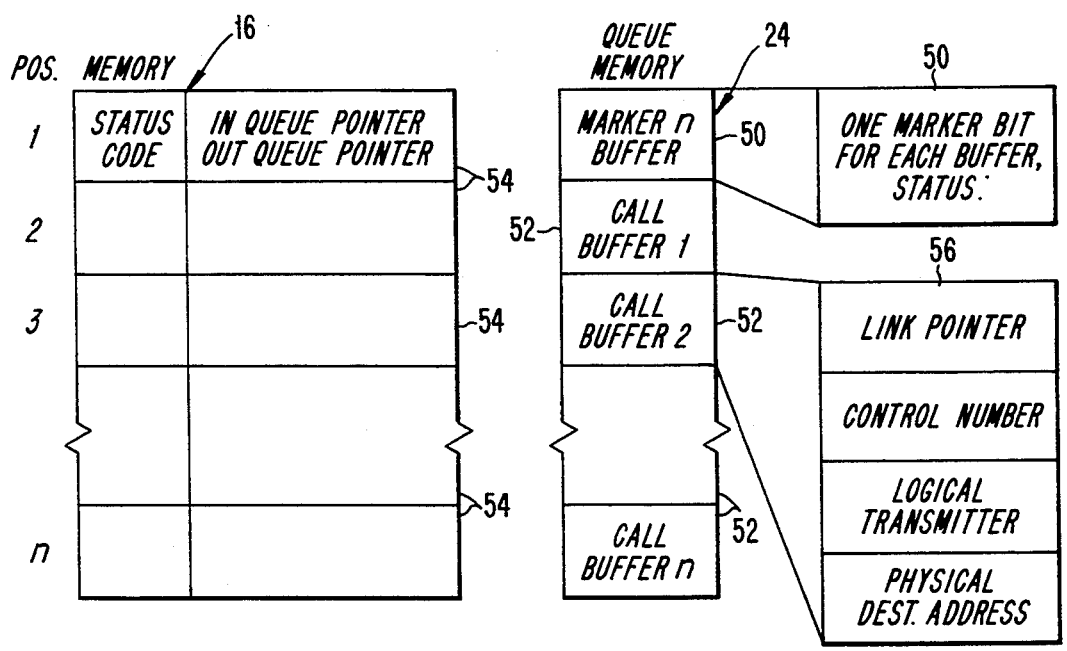
FIG. 4 shows the disposition of the occupied/unoccupied memory and the queue memory in a second embodiment of the invention.

In such cases an embodiment using the queue memory as a common resource can reduce the memory requirement drastically and make the function more practical to implement. FIG. 4 shows the disposition of the occupied/unoccupied memory and the queue memory for such an implementation.

In this embodiment a pointer 54 is allocated to the occupied/unoccupied memory 16, which points to a next call stored in the queue memory 24 for the receiver of the terminal unit associated with the position in the occupied/unoccupied memory 16. By organising the queue memory 24 as a number of "call positions" or call buffers, 52 and by assigning these call positions 52 to calls and linking the assigned positions to each other and to the position in the occupied/unoccupied memory, queueing structures can be built of variable length and with considerably less memory consumption than in the functionally simpler implementation, acccording to the preceding embodiment. Of course, other variations of queueing structures can also be built where e.g. a certain number of call positions according to the simpler implementation are assigned to ready made queueing structures.

Reference is now made to FIG. 4. When a control package arrives to the control memory terminal 14 with the operational code "connect if unoccupied, queue if a queue position is available", the control memory terminal 14 reads the occupied/unoccupied memory 16 as usual, and will find that the receiver is occupied. The control memory terminal 14 will then search in markers, in a marker area 50 in the queue memory 24, for an unoccupied one of call buffers 52. In the marker area 50 each bit position represents the address of a call buffer 52 and the content represents either unoccupied or occupied. When an unoccupied buffer 52 has been found the call is stored there and the marker for this buffer is occupied-marked, and an acknowledgment with the information "queued" is transmitted. (If no unoccupied buffer is found an acknowledgment with the information "occupied and no queue positions available" is transmitted.) For linking the buffer into a call list the control memory terminal 14 reads from the occupied/unoccupied memory 16 an in-queue-pointer, at 54 associated with the position in question. The in-queue-pointer 54 indicates the absolute address in the queue memory 24 to the buffer position 52 where the latest stored call for this receiver is to be found.

If an earlier stored call exists (the status in the occupied/unoccupied memory 16 is: "occupied and queued") the control memory terminal 14 writes the absolute address of the buffer position 52, where the new call should be stored, into the very buffer position 52, shown at 56, where the latest call is stored so that its position 56 points to the buffer position 52 of the new call.

If an earlier stored call does not exist (the status in the occupied/unoccupied memory 16: "occupied and not queued") the control memory terminal 14 writes the absolute address of the buffer position 52, where the new call should be stored, into the position for out-queue-pointers connected to the occupied/unoccupied memory 16, likewise at 54. Then the call is written into the assigned buffer, at 52, and its position 56 is cleared.

When an unoccupied-marked and queued position in the occupied/unoccupied memory 16 is read in connection with a request for disconnect, the control memory terminal 14 reads an out-queue-pointer belonging to the position, likewise shown at 54, said pointer pointing to the message which is ready to be served for the associated receiver. The out-queue-pointer 54 indicates the absolute address of the call buffer 52 for the call. After disconnect the buffer position in the marker area 50 is unoccupied-marked and the link-pointer, at 56, for the unoccupied-marked buffer position is written as a new out-queue-pointer. If the link pointer 56 is zero or, alternatively, the in-queue-pointer equals the out-queue-pointer, this implies that no more calls are queued. The control memory terminal 14 then also changes the status in the occupied/unoccupied memory 16 to: "occupied and not queued".

To accelerate the control logic in the control memory terminal 14 which manages the queue memory 24 as a common resource, hardware can be added to quickly find unoccupied buffers 52 in the marker area 50. Examples of this are hardware logic which aided by combining methods will find the most significant 1 in a variable.

Figure 5:
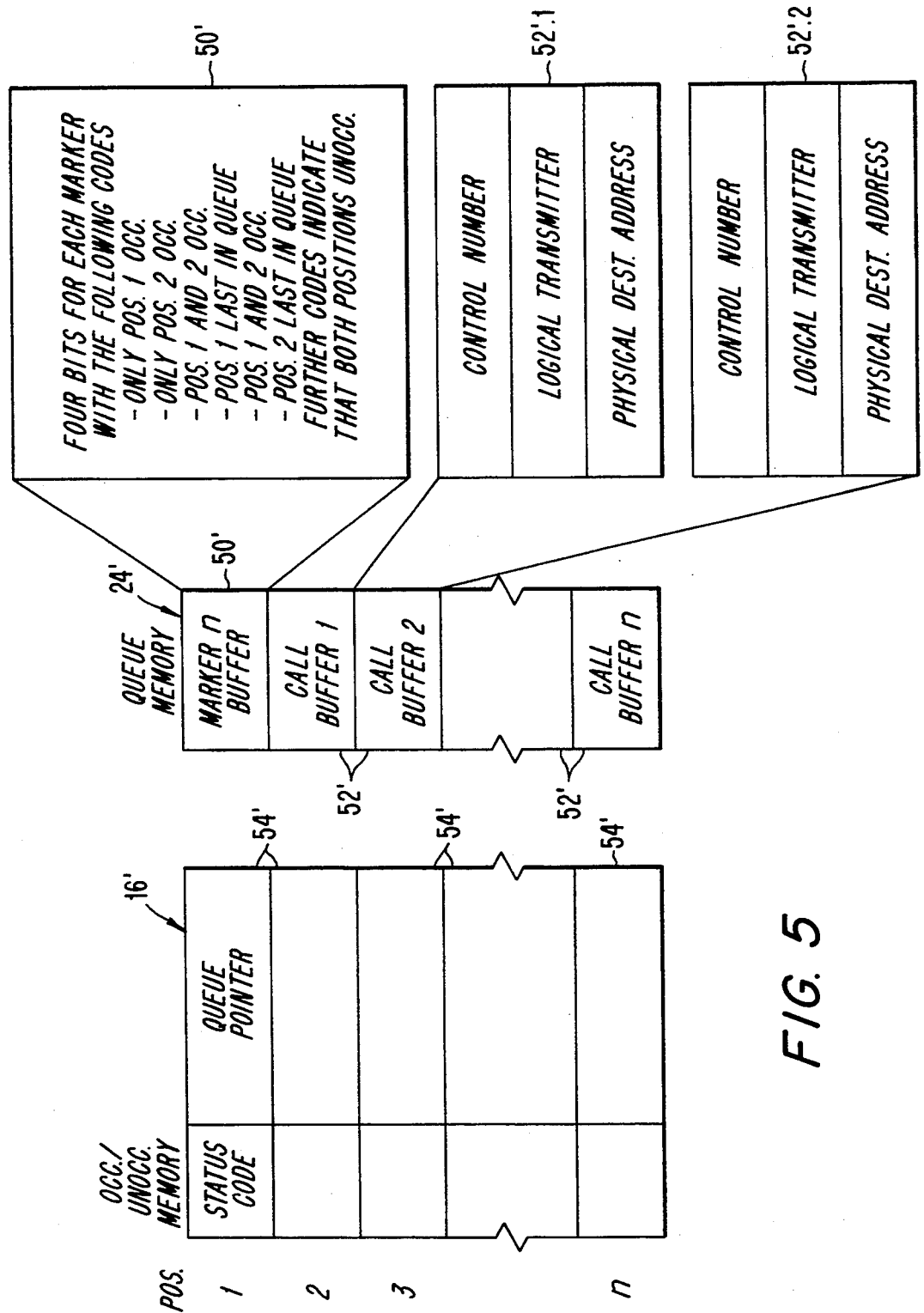
FIG. 5 shows the disposition of the occupied/unoccupied memory and the queue memory in a third embodiment of the invention.

In FIG. 5 an embodiment is shown in which a common queue resource 24' has a certain number of call buffers 52'. To every call buffer two queue positions 52'.1 and 52'.2, respectively, are alloted. At the appearance of a call that needs to be queued, and there is no call before in the queue for the called receiver, an unoccupied call buffer 52' is searched in the marker area 50'. The address to the found call buffer is written as a pointer 54' into the occupied/unoccupied memory 16 in the position of the called receiver and the call is stored in the queue memory 24' in the position associated with the marker position. In the marker position a code is written indicating that only one queue position is occupied. If a new call arrives for the same receiver, the occupied/unoccupied memory 16' indicates that a call is queued earlier. The call is now stored in the other queue position and status in the marker for the call buffer 52' is changed to indicate that both positions 52'.1 and 52'.2 are occupied and that the last used position is last in the queue. The four bits contained in the marker area of each call buffer may be coded as follows as shown in FIG. 5:

only queue position 1 occupied;
only queue position 2 occupied;
both queue positions occupied, queue position 1 last in the queue;
both queue positions occupied, queue position 2 last in the queue;

Further codes indicate that both positions are unoccupied. Still further codes can be used for expanding the number of queue positions in a call buffer.

When the receiver in question becomes unoccupied and status in the occupied/unoccupied memory 16' shows that a queued call exists, the pointer 54' is read, and the call stored on the position indicated by the pointer to be the first one in the queue, is connected. Marker status is thereafter changed to indicate that both positions are unoccupied, or that only one is occupied, as the case may be. If the final result is that both positions become unoccupied, also status in the occupied/unoccupied memory 16' is changed to: "connected and not queued".

Figure 6:
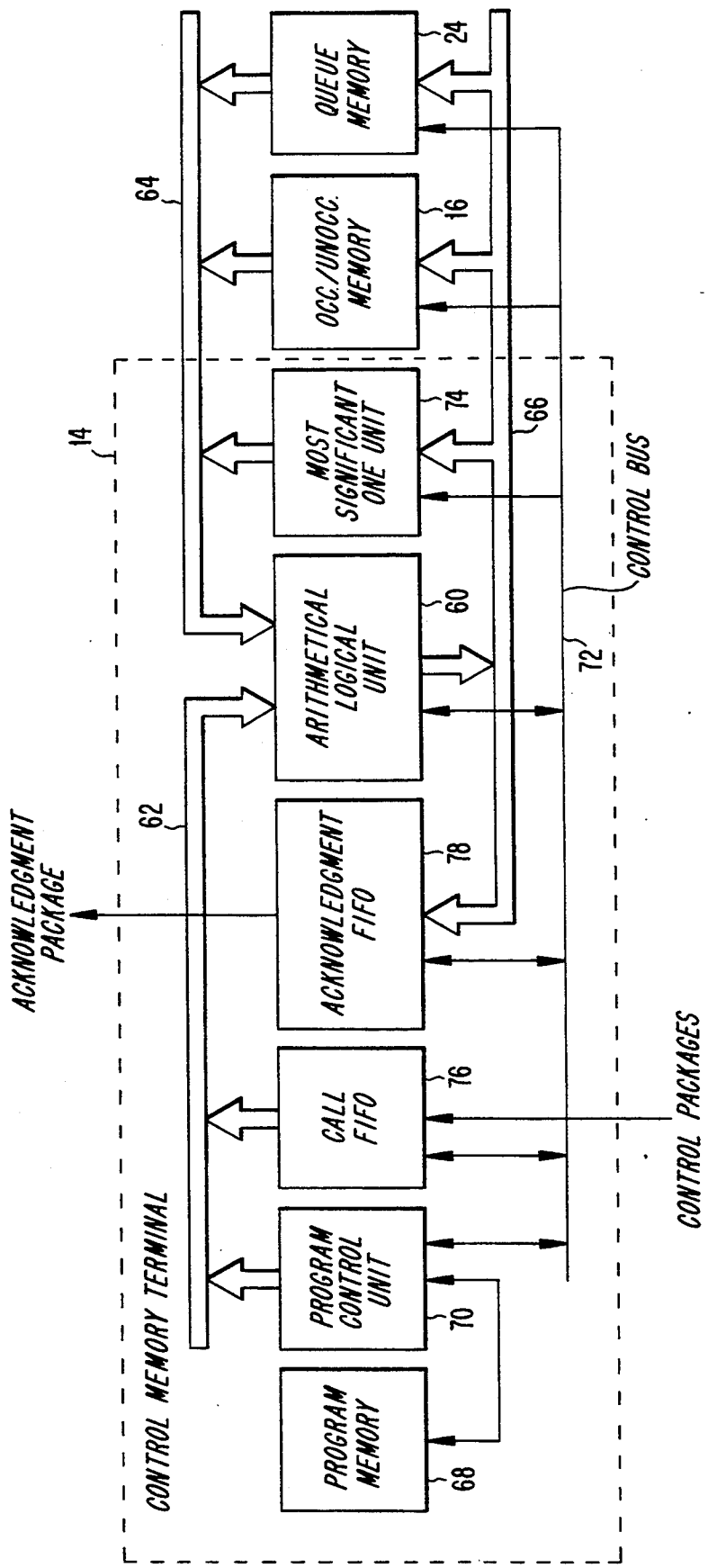
FIG. 6 shows a detail of the switch according to FIG. 1, illustrating the internal structure of the control memory terminal with connected occupied/unoccupied memory and queue memory.

FIG. 6 schematically shows how a control memory terminal 14 together with the occupied/unoccupied memory 16 and the queue memory 24 can be designed internally, in accordance with microprocessor architecture known per se, with an arithmetical unit 60 as the central combinational logic unit, and with memories and functional units connected by system buses 62, 64, 66. A program memory 68 with an associated control unit 70 controls the interaction between the units for each program step via a control bus 72. A unit quickly finding the most significant 1 in a variable, as has been described above, is denoted by 74.

Call fifo:s for control packages are denoted by 76 and acknowledgment fifo:s for acknowledgment packages are denoted by 78.

The flow of operations which are carried out appears from the directions of the arrows.

The following operational codes for control operations associated with the queueing function are then feasible:

1. Connect if unoccupied, do not queue if occupied,
2. Connect if unoccupied, queue if no call before in queue,
3. Connect if unoccupied, queue if a queue position is available,
4. Disconnect (connect queued calls),
5. Remove queued calls. This command is treated in the same way as earlier described when a new connection should be made of a queued call. The only difference is that the connection is not made and that the whole call area and the linked list are cleared before status in the occupied/unoccupied memory 16 is set to: "occupied and not queued". Then the proper acknowledgment "request accomplished" is transmitted.

The following acknowledgments associated with the queueing function are feasable:
1. Connection established,
2. Request for connection queued,
3. Queued request for connection established, 4. Request accomplished (disconnect, remove calls in queue),
5. Occupied and no queue positions available.

What is claimed is:

1. A digital switch serving a number of terminal units for switching signal traffic therebetween, said traffic being logically divided into data time slots and control time slots with control packets, comprising
   a switch memory for receiving said data time slots,
   a control memory for storing information for facilitating through connection of said data time slots in said switch memory,
   a control memory terminal for receiving said control time slots with control packets, for writing information into the control memory, and for transmitting acknowledgement packets to called and calling ones of said terminal units,
   an occupied/unoccupied memory cooperating with said control memory terminal and storing actual status information of each of said terminal units,
   queue memory, associated with said control memory terminal and said occupied/unoccupied memory,
   wherein the control memory terminal includes control logic means for controlling interaction between the control memory terminal, the queue memory and the occupied/unoccupied memory, and the control memory terminal, occupied/unoccupied memory and queue memory cooperate for effecting, in case a first terminal unit tries to establish connection to a second terminal unit which is occupied,
   queuing of a call request and transmission to said first terminal unit of an acknowledgement "request for connection queued" and,
   at the receipt of a request for disconnection from said second terminal unit, direct connection of said first terminal unit to said second terminal unit, and
   transmission of acknowledgements to said first and second terminal units with the information "connection effected" and "request effected", respectively.

2. A digital switch according to claim 1, wherein said occupied/unoccupied memory includes positions for storing terminal unit status codes "occupied and queued" and first pointers to said queue memory, each occupied/unoccupied memory position being associated with a respective terminal unit and storing at least a respective first pointer.

3. A digital switch according to claim 2, wherein the queue memory includes a plurality of positions and at least one queue memory position is assigned to each position in said occupied/unoccupied memory and each first pointer comprises an address in said queue memory.

4. A digital switch according to claim 3, wherein each position in said occupied/unoccupied memory represents an addressed receiving terminal unit.

5. A digital switch according to claim 4, wherein said occupied/unoccupied memory includes positions for storing terminal unit status codes "not used", "unoccupied", "occupied and queued", and "occupied and not queued", the terminal unit status code stored in an occupied/unoccupied memory position depending on a status of the respective terminal unit.

6. A digital switch according to claim 5, wherein status for "occupied and queued" and "occupied and not queued" for a terminal unit are respectively indicated by fourth and fifth pointers stored in the terminal unit's respective occupied/unoccupied memory position, the fourth and fifth pointers comprising respectively an absolute address of a first queue memory position where a latest stored call for the terminal unit is to be found, and an absolute address of a second queue memory position for a call ready to be served by the terminal unit.

7. A digital switch according to claim 4, wherein a status "occupied and queued" and a status "occupied and not queued" for a terminal unit are indicated respectively by second and third pointers stored in queue memory positions associated with the terminal unit, the second and third pointers respectively pointing to a queue memory position where a next call for the terminal unit will be stored, and to a queue memory position indicating which call is in turn to be served when the terminal unit has been disconnected.

8. A digital switch according to claim 7 wherein each position in said occupied/unoccupied memory points to a respective call area in the queue memory, each call area comprising a predetermined number of positions, the predetermined number being the same for all positions in the occupied/unoccupied memory, and each call area being able to store identifying information for a number of calls in positions for area description and in positions for calls, the call positions storing information relating to control numbers, addressed transmitting terminal units, and physical destination addresses.

9. A digital switch according to claim 8, wherein said second and third pointers are stored in said positions for area description in said queue memory.

10. A digital switch according to claim 9, wherein for each call area, the control logic means in said control memory terminal compares said second and third pointers with each other and with a last position in said call area.

11. A digital switch according to claim 1, wherein the queue memory includes a plurality of call positions for assignment to calls for terminal units, a number of call positions assigned to calls for each terminal unit being selectively controllable, whereby the queue memory is used as a common resource.

12. A digital switch according to claim 11, wherein the occupied/unoccupied memory includes a plurality of positions, each position being associated with a respective terminal unit and a pointer that points to a next call request for the terminal unit associated with the position, said next call request being stored in said queue memory.

13. A digital switch according to claim 12, wherein for each terminal unit, queue memory call positions assigned to calls for the terminal unit are linked to each other and to said position in the occupied/unoccupied memory associated with the terminal unit, and different numbers of call positions are assigned to calls for different terminal units.

14. A digital switch according to claim 13, further comprising means for finding unoccupied call positions from a marker area included in said queue memory.

15. A digital switch according to claim 11, wherein said queue memory has a number of call buffers, each call buffer comprising at least two call positions, and a marker area comprising a plurality of marker positions for indicating the status of call positions in call buffers respectively associated with the marker positions.

16. A digital switch according to claim 15, comprising means for effecting, upon appearance of a call request for a terminal unit needing to be queued, searching said marker area for a marker position associated with a call buffer including a call position having the status "unoccupied", writing, into an occupied/unoccupied memory position associated with the terminal unit, an address to the call buffer that includes the unoccupied call position, and storing said call request in said queue memory in the unoccupied call position.

17. A digital switch according to claim 16, wherein said effecting means also includes means for writing in a marker position in said marker area codes indicating the status of the call positions included in the call buffer associated with the marker position into which the codes are written, the codes being written when the status changes.

18. A digital switch according to claim 17, wherein, when a call buffer includes two call positions, said codes written in the marker position associated the call buffer include four bits coded as follows:

only a first one of the two call positions is occupied;

only a second one of the two call positions is occupied;

the first and second call positions are occupied, and the first call position is last in queue; and the first and second call positions are occupied, and the second call position is last in queue.

19. A digital switch according to claim 18, wherein said bits are further coded to indicate that the first and second call positions are unoccupied.

20. A digital switch according to claim 17 wherein said bits are further coded for indicating the status of more than two call positions in a call buffer.

* * * * *